(12) United States Patent
Carlson

(10) Patent No.: US 6,419,497 B1
(45) Date of Patent: Jul. 16, 2002

(54) TACTILE SENSING DEVICE

(76) Inventor: Elizabeth A. Carlson, 1566 Three Lanterns La., Tallahassee, FL (US) 32301

( * ) Notice: Subject to any disclaimer, the term of this patent is extended or adjusted under 35 U.S.C. 154(b) by 0 days.

(21) Appl. No.: 09/716,838

(22) Filed: Nov. 20, 2000

(51) Int. Cl.[7] ............................................... G09B 25/00
(52) U.S. Cl. ...................... 434/367; 434/402; 434/404; 434/247; 40/306; 217/11; 217/58
(58) Field of Search ........................... 434/367, 73–78, 434/101, 104, 113, 161, 171, 172, 369, 403–405, 419, 402, 429; 40/446, 124, 124.01; 217/9, 11, 58, 10, 63; 446/129, 133, 137, 149, 151, 152; 312/114; 261/14; D20/40

(56) References Cited

U.S. PATENT DOCUMENTS

| | | | | |
|---|---|---|---|---|
| 1,595,115 A | * | 8/1926 | Myers ........................ | 434/367 |
| 1,789,228 A | * | 1/1931 | Froboese et al. ........... | 434/367 |
| 2,121,246 A | * | 6/1938 | Gordon ....................... | 434/367 |
| 2,172,172 A | * | 9/1939 | Mount ........................ | 434/367 |
| 2,364,609 A | * | 12/1944 | Almquist .................... | 434/367 |
| 2,817,915 A | * | 12/1957 | Chatkin ....................... | 40/132 |
| 3,484,105 A | * | 12/1969 | Winston ........................ | 273/1 |
| 3,510,964 A | * | 5/1970 | Dahners et al. ............... | 35/22 |
| 3,726,027 A | * | 4/1973 | Cohen et al. .................. | 35/72 |
| 3,745,673 A | * | 7/1973 | Jimerson et al. ............ | 434/332 |
| 3,793,756 A | * | 2/1974 | Kay et al. ...................... | 40/306 |
| 4,146,977 A | | 4/1979 | Barberi ........................ | 35/77 |
| 4,262,432 A | * | 4/1981 | Hachimura .................. | 434/161 |
| 4,458,435 A | * | 7/1984 | Ackerman .................... | 40/405 |
| 5,562,459 A | * | 10/1996 | Durlach ...................... | 434/402 |
| 5,598,667 A | * | 2/1997 | Dykes ........................... | 52/71 |
| 5,720,617 A | * | 2/1998 | Var .......................... | 229/122.2 |

FOREIGN PATENT DOCUMENTS

DE          3518890 A1 * 12/1985 ............ A61B/5/16

* cited by examiner

*Primary Examiner*—Derris H. Banks
*Assistant Examiner*—Dmitry Suhol
(74) *Attorney, Agent, or Firm*—Peter Loffler

(57) ABSTRACT

A tactile sensing device allows a user to utilize tactile senses in order to distinguish between a plurality of different surface textures. A body member has a plurality of openings with a plate member rotatably disposed therein. Each plate member has a first surface with a first texture thereon and a second surface with a second texture thereon. Each first texture is unique with respect to each other and each second texture is unique with respect to each other. A magnet is attached to the rim of each opening while each plate member has a magnetically sensitive portion, or vice versa, for limiting plate member rotation. A chamber may be located on at least one end of the body member.

20 Claims, 5 Drawing Sheets

TACTILE SENSING DEVICE

BACKGROUND OF THE INVENTION

1. Field of the Invention

The present invention relates to a device that allows a user to utilize tactile senses in order to distinguish between a plurality of different surface textures.

2. Background of the Prior Art

One of the objectives in teaching visually impaired individuals, especially those individuals that are born blind, as well as developmentally challenged individuals, is teaching such individuals various textures of objects. Many devices and methods are known in the art to help such persons learn and distinguish among a variety of textures associated with objects. However, many prior art devices are relatively complex in design and construction and are unnecessarily difficult for use by the target user. This results in a device that is costly and tends to result in frustration in device use by the user resulting in early termination of the learning process. Other prior art devices and methods rely on haphazardly collecting various textured surfaces and arbitrarily introducing such surfaces to the target user. This tends to result in the user not obtaining the entire block of knowledge desired.

Therefore, there is a need in the art for a device that allows a user to learn a plurality of different surface textures and to distinguish among the various surfaces. The device must be of relatively simple design and construction and must be relatively easy to use. The device must allow the systematic presentation of the various surfaces to the user.

SUMMARY OF THE INVENTION

The tactile sensing device of the present addresses the aforementioned needs in the art. The tactile sensing device allows a user, through tactile sensation, to be exposed to a variety of different surfaces each having a different texture. The device is of relatively simple design and construction and is relatively simple to use. The device allows the user to be exposed to the various textures in a straightforward and systematic fashion.

The tactile sensing device of the present invention comprises a body member having a plurality of sides. An opening having a rim is disposed within each of the plurality of sides, each opening has a plate member rotatably disposed within the opening, each plate member has a first surface and second surface, each first surface has a first texture thereon and each second surface has a second texture thereon. Each of the first textures is unique with respect to each other and each of the second textures is unique with respect to each other. The body member may be a generally rectangular solid and may be hollow. A hollow chamber is disposed within an end of the body member and is separated from the opening by a wall. A latchable door is attached to the body member for gaining access to the chamber. Each opening has a first shape and each plate member has a second shape that generally corresponds to the first shape. Each plate member rotates about an axis disposed along a plane of the opening. A magnet is attached to the rim of each opening and each plate member has a magnetically sensitive portion that corresponds to the magnet in order to limit rotation of the plate member within the opening or a magnet is attached to each plate member and the rim of each opening has the magnetically sensitive portion that corresponds to the magnet. Each of the first textures may also be unique with respect to each of the second textures. Each of the first textures and each of the second textures are chosen from the group consisting of a rough flexible pile surface, a furry surface, a soft fabric surface, a cushiony textured surface, a soft bumpy surface, a textured metallic surface, a hard bumpy surface, a fine granular surface, and a Braille character surface. Other textures can also be used.

BRIEF DESCRIPTION OF THE DRAWINGS

Similar reference numerals refer to similar parts throughout the several views of the drawings.

DESCRIPTION OF THE PREFERRED EMBODIMENT

Figure 1:
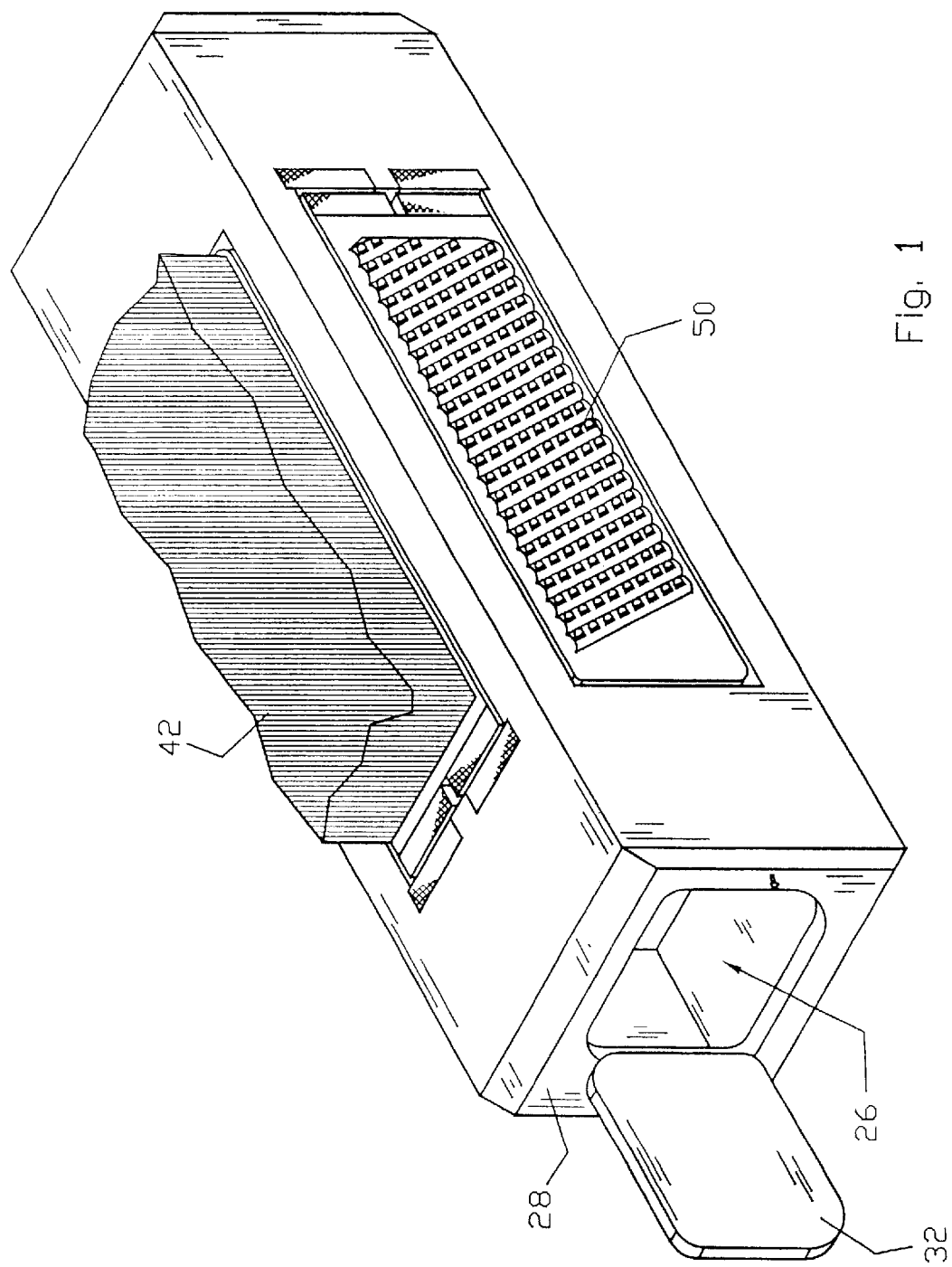
FIG. 1 is a perspective view of the tactile sensing device of the present invention.
Figure 2:
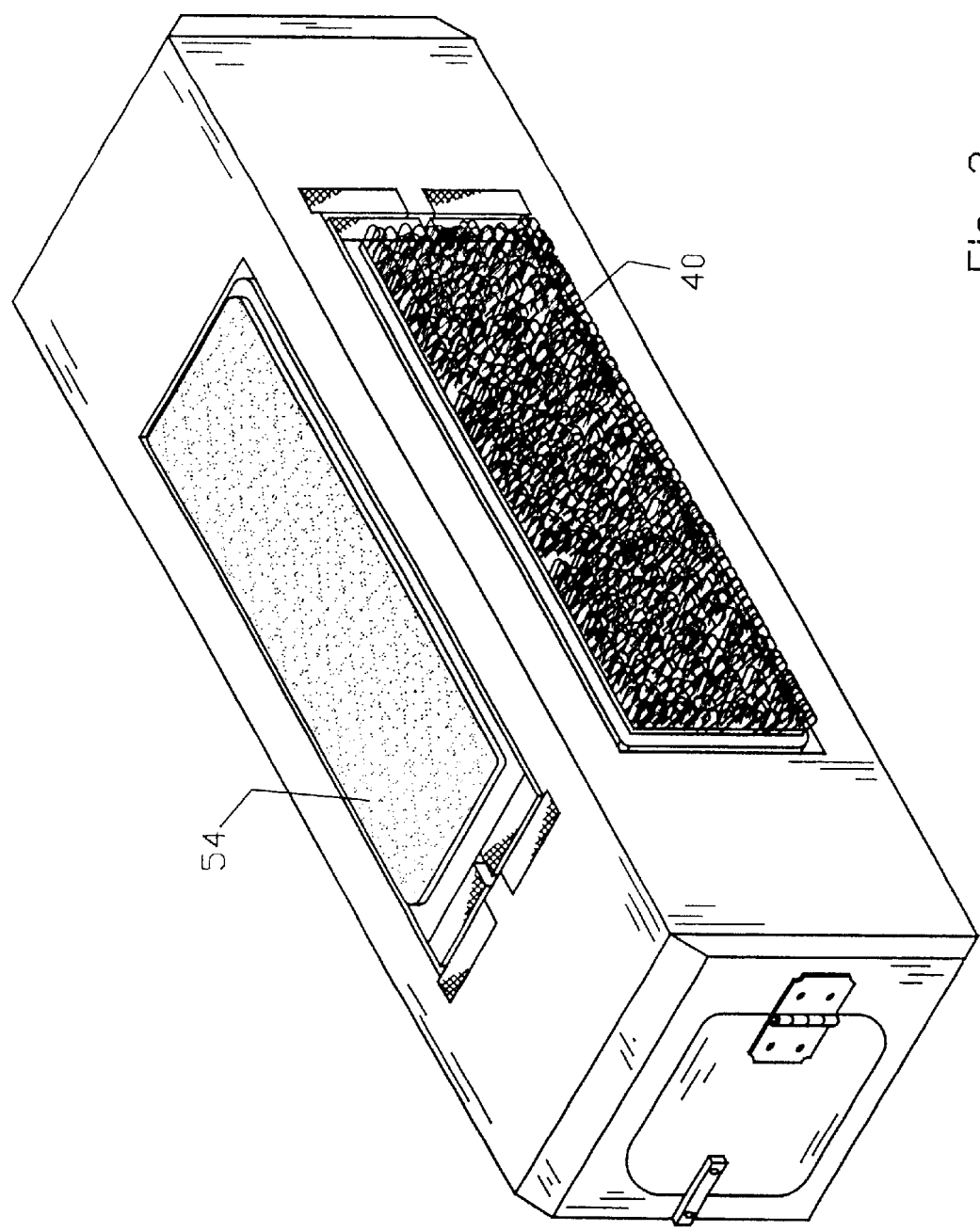
FIG. 2 is a perspective view of the tactile sensing device of the present invention with different textures thereon.
Figure 3:
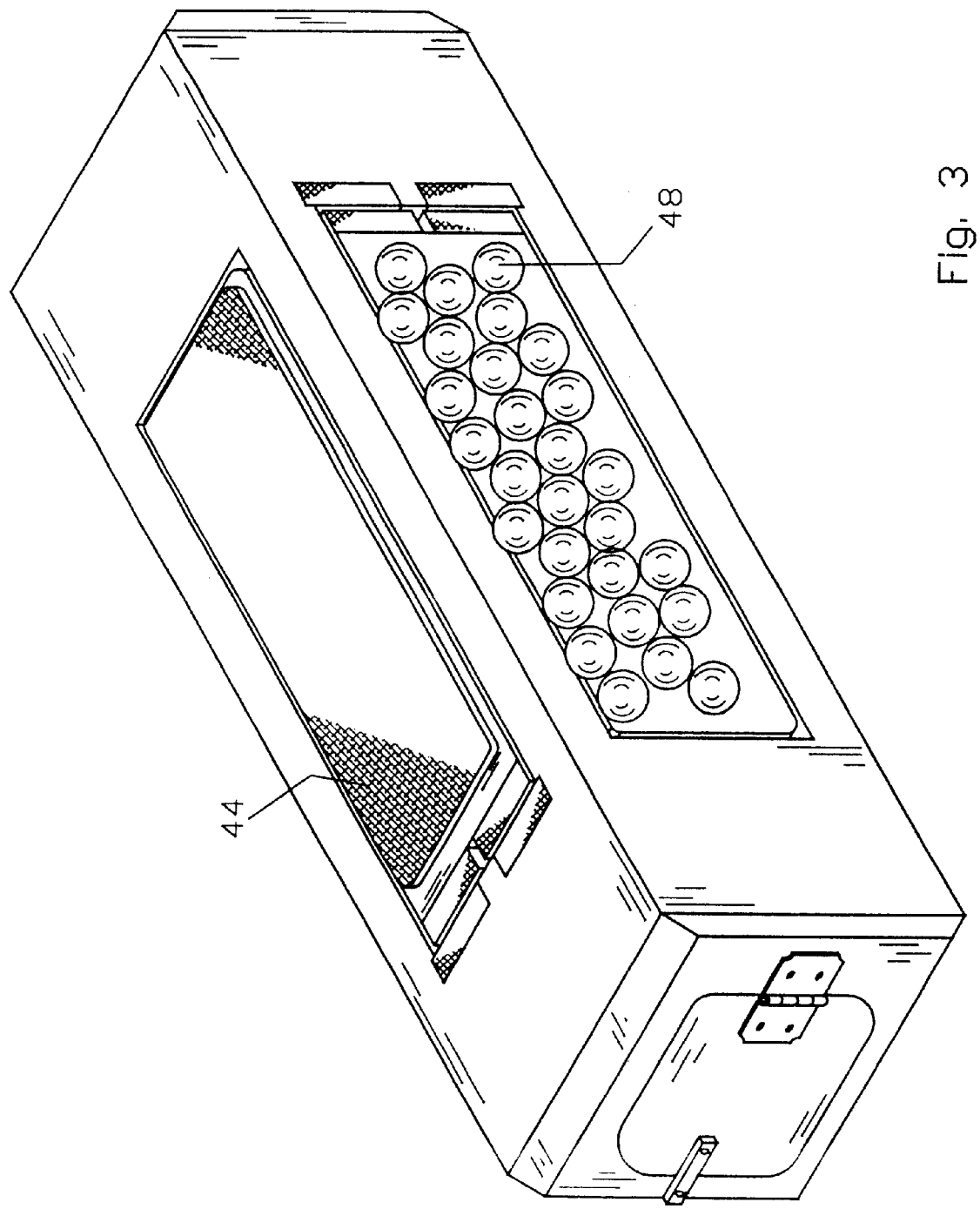
FIG. 3 is a perspective view of the tactile sensing device of the present invention with different textures thereon.
Figure 4:
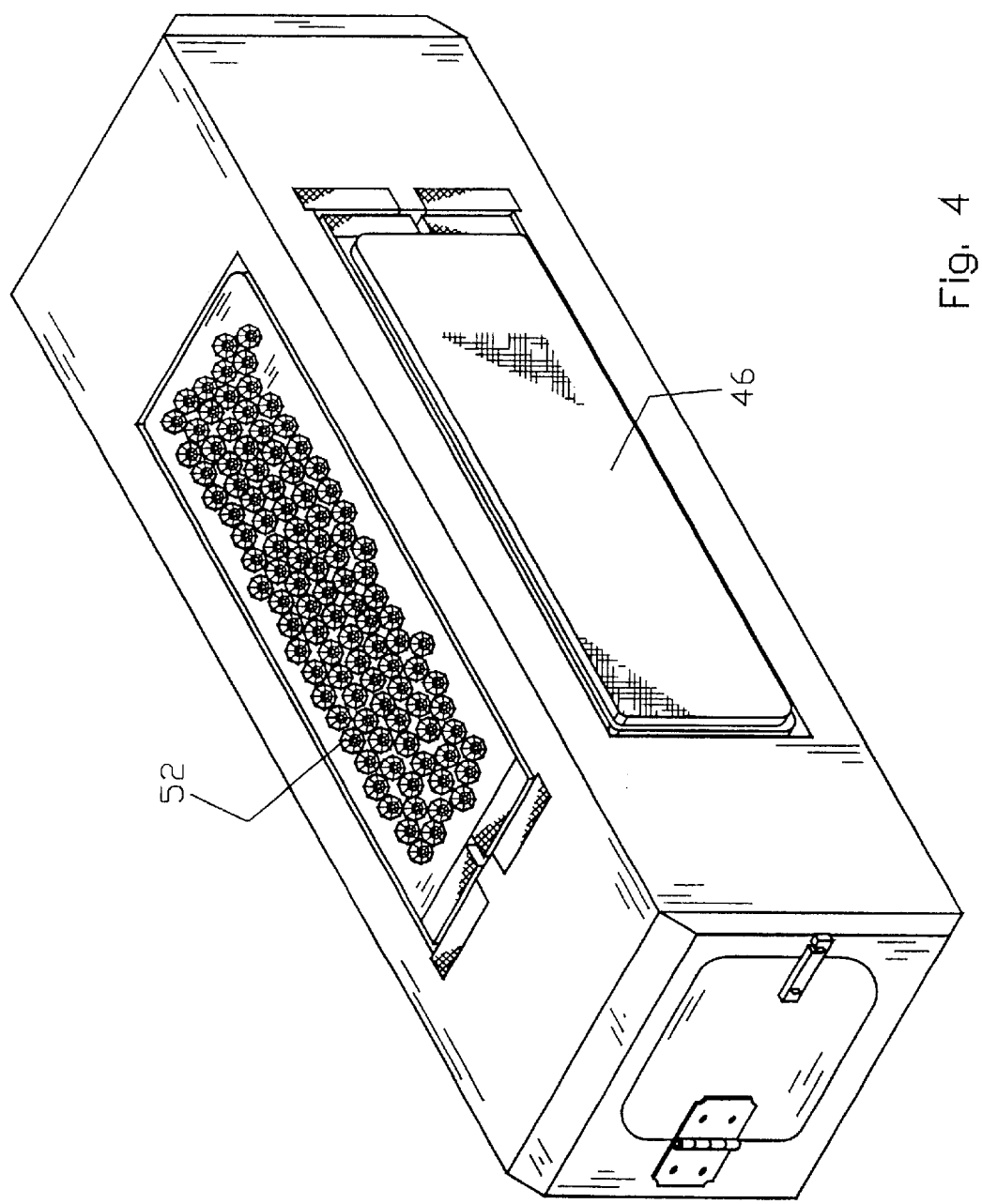
FIG. 4 is a perspective view of the tactile sensing device of the present invention with different textures thereon.
Figure 5:
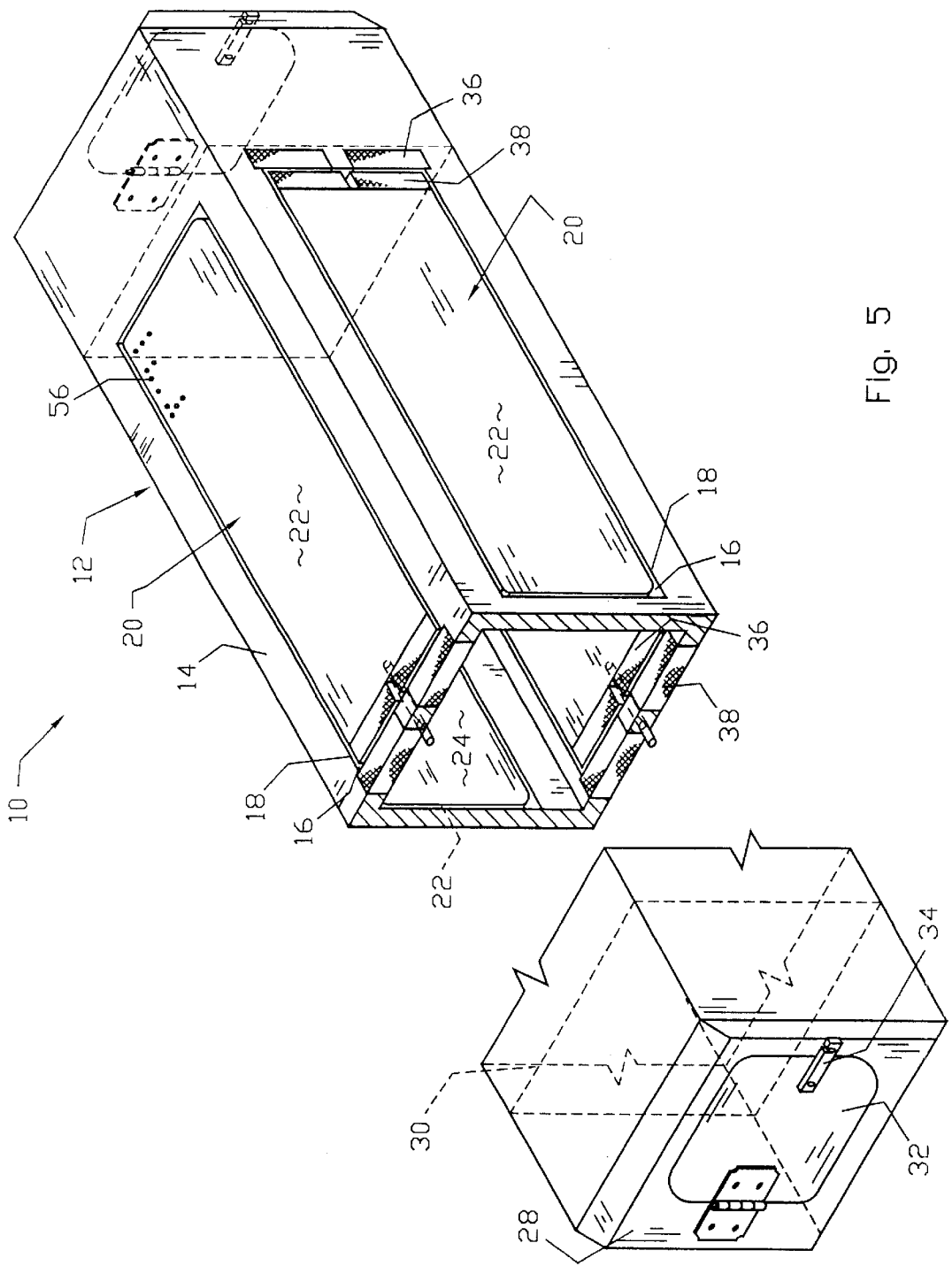
FIG. 5 is an exploded view of the tactile sensing device of the present invention.

Referring now to the drawings, it is seen that the tactile sensing device, generally denoted by reference numeral 10, is comprised of a body member 12 having a plurality of sides 14. An opening 16 having a rim 18 is disposed within each of the plurality of sides 14, each opening 16 has a plate member 20 rotatably disposed within one of the openings 16, each plate member 20 has a first surface 22 and second surface 24, each first surface 22 has a first texture thereon and each second surface 24 has a second texture thereon. Each of the first textures is unique with respect to each other. Each of the second textures is unique with respect to each other. Each of the first textures may also be unique with respect to each of the second textures. The body member 12 may be any appropriate shape such as the illustrated generally rectangular solid and the body member 12 may be hollow.

A hollow chamber 26 is disposed within at least one end 28 of the body member 12 and is separated from the openings 16 by a wall 30. A door 32, which may have a latch 34, is attached to the body member 12 for gaining access to the chamber 26. Each opening 16 has a first shape and each plate member 20 has a second shape that generally corresponds to the first shape. The plate member 20 may but need not fit snugly within its respective opening 16. Each plate member 20 rotates about an axis disposed along a plane of the opening 16. A magnet 36 is attached to the rim 18 of each opening 16 and each plate member 20 has a magnetically sensitive portion 38 that corresponds to the magnet 36 in order to limit rotation of the plate member 20 within the opening 16 or alternately, the magnet 36 is attached to each plate member 20 and the rim 18 of each opening 16 has the magnetically sensitive portion 38 that corresponds to the magnet 36.

Each of the first textures and each of the second textures are chosen from the group consisting of a rough flexible pile surface 40 (made from ASTROTURF or similar artificial pile), a furry surface 42 (made from fur, either real or imitation), a soft fabric surface 44 (made from felt or similar material), a cushiony textured surface 46 (made from foam), a soft bumpy surface 48 (made from pom poms or similar items), a textured metallic surface 50 (made from sure form, a metallic grate, or similar item), a hard bumpy surface 52

(made from faceted beads or similar items), and a fine granular surface 54 (made from sandpaper or similar item). Other textures may also be used within the scope and spirit of the present invention. Additionally, each texture may be represented in more than one grade. For example, the fine granular surface 54 may be present in a coarse grade, a medium grade, and a fine grade, the cushiony textured surface 46 may be open cell or closed cell, and may be relatively course or relatively smooth, the hard bumpy surface 52 may be present in small size and in a large size, etc. More than one texture may be present on a given surface 22 or 24. Furthermore, Braille characters 56 or sentences may be the texture that is represented on each surface 22 and 24.

In use, each plate member 20 is rotated so that the desired texture is exposed to the user. The plate member 20 is in position when the plate member 20 is positioned on the plane of the opening 16. In position, the magnet 36 and the magnetically sensitive portion 38 hold the plate member 20 in place requiring some effort to rotate the plate member 20. When the texture located on the non-exposed surface of the plate member 20 is desired, the plate member 20 is rotated 180 degrees in order to expose the next texture. Additional texture elements can be stored within the chamber 26 and retrieved as desired.

While the invention has been particularly shown and described with reference to an embodiment thereof, it will be appreciated by those skilled in the art that various changes in form and detail may be made without departing from the spirit and scope of the invention.

I claim:

1. A tactile sensing device comprising:

a body member having a plurality of sides;

a plurality of openings each having a rim, each opening disposed within a respective one of the plurality of sides, each opening having a plate member rotatably disposed therein, the plate member having a first surface and second surface, each first surface having a first texture thereon and each second surface having a second texture thereon, each of the first textures being unique with respect to each other and each of the second textures being unique with respect to each other; and wherein each of the first textures is unique with respect to each of the second textures.

2. The tactile sensing device as in claim 1 wherein the body member is generally rectangular in shape.

3. The tactile sensing device as in claim 2 wherein a hollow chamber is disposed within an end of the body member.

4. The tactile sensing device as in claim 3 further comprising a door attached to the body member for gaining access to the chamber.

5. The tactile sensing device as in claim 1 wherein a hollow chamber is disposed within an end of the body member.

6. The tactile sensing device as in claim 5 further comprising a door attached to the body member for gaining access to the chamber.

7. The tactile sensing device as in claim 1 wherein the body member is hollow.

8. The tactile sensing device as in claim 7 further comprising:

a wall disposed within the body member between the openings and a first end of the body member; and a door attached to the first end.

9. The tactile sensing device as in claim 1 wherein each opening has a first shape and each plate member has a second shape that is generally similar to the first shape.

10. The tactile sensing device as in claim 1 wherein each plate member rotates about an axis disposed along a plane of the opening within which the plate is disposed.

11. The tactile sensing device as in claim 1 wherein a magnet is attached to the rim of each opening and each plate member has a magnetically sensitive portion that magnetically couples with the magnet in order to limit rotation of the plate member within the opening whenever the first surface or the second surface of the plate member is disposed on a plane that is parallel with the opening.

12. The tactile sensing device as in claim 1 wherein a magnet is attached to each plate member and the rim of each opening has a magnetically sensitive portion that corresponds to the magnet in order to limit rotation of the plate member within the opening.

13. The tactile sensing device as in claim 1 wherein each of the first textures and each of the second textures are chosen from the group consisting of a rough flexible pile surface, a furry surface, a soft fabric surface, a cushiony textured surface, a soft bumpy surface, a textured metallic surface, a hard bumpy surface, a fine granular surface, and a Braille character surface.

14. The tactile sensing device as in claim 1 wherein each of the second textures is unique with respect to each of the first textures.

15. The tactile sensing device as in claim 14 wherein each of the first textures and each of the second textures are chosen from the group consisting of a rough flexible pile surface, a furry surface, a soft fabric surface, a cushiony textured surface, a soft bumpy surface, a textured metallic surface, a hard bumpy surface, a fine granular surface, and a Braille character surface.

16. A tactile sensing device comprising:

a body member having a plurality of sides;

a plurality of openings each having a rim, each opening disposed within a respective one of the plurality of sides each opening having a plate member rotatably disposed therein, the plate member having a first surface and second surface, each first surface having a first texture thereon and each second surface having a second texture thereon, each of the first textures being unique with respect to each other and each of the second textures being unique with respect to each other; and wherein each of the second textures is unique with respect to each of the first textures.

17. The tactile sensing device as in claim 16 wherein the body member is generally rectangular in shape.

18. The tactile sensing device as in claim 17 wherein a hollow chamber is disposed within an end of the body member.

19. The tactile sensing device as in claim 18 further comprising a door attached to the body member for gaining access to the chamber.

20. The tactile sensing device as in claim 16 wherein a hollow chamber is disposed within an end of the body member.

* * * * *